United States Patent [19]
Ishii

[11] 3,852,647
[45] Dec. 3, 1974

[54] EXPLOSION PROOF STRUCTURE FOR ELECTROLYTIC CAPACITOR

[75] Inventor: Hiroshi Ishii, Nagano-ken, Japan

[73] Assignee: Nichicon Capacitor Limited, Kyoto, Japan

[22] Filed: June 15, 1973

[21] Appl. No.: 370,210

[30] Foreign Application Priority Data
June 21, 1972 Japan.......................... 47-73457[U]

[52] U.S. Cl.................................. 317/230, 29/570
[51] Int. Cl............................................... H01g 9/00
[58] Field of Search ............... 317/230, 242; 29/570

[56] References Cited
UNITED STATES PATENTS

| | | | |
|---|---|---|---|
| 1,032,032 | 7/1912 | Staunton.......................... | 317/230 X |
| 1,880,263 | 10/1932 | Lilienfeld........................... | 317/230 |
| 3,401,314 | 9/1968 | Steele ................................ | 317/230 |
| 3,686,536 | 8/1972 | Pearce et al....................... | 317/230 |

*Primary Examiner*—Andrew J. James

[57] ABSTRACT

An electrolytic capacitor wherein the capacitor is enclosed within a single open-ended casing. The casing is closed by a terminal plate having a central opening therein and the terminal plate includes an underlying layer of thermo plastic resin having a cylindrical hollow projection extending into the opening and a diaphragm of said resin closing the hollow projection.

2 Claims, 4 Drawing Figures

PATENTED DEC 3 1974

3,852,647

EXPLOSION PROOF STRUCTURE FOR ELECTROLYTIC CAPACITOR

This invention relates to an improved electrolytic capacitor, especially to an improved explosion-proof structure therefor.

The interior temperature of the casing of an electrolytic capacitor may increase by reason of deterioration of the capacitor element or by application of excessive voltage. If such conditions continue for a long time, a part of electrolyte impregnated in the capacitor element evaporates to raise the pressure within the casing and it tends to cause an explosion. In order to avoid such danger, some electrolytic capacitors are provided with explosion-proof structures such as an explosion-proof valve which can exhaust gas and vapor produced in the casing when a predetermined pressure is reached.

In the prior explosion-proof structures, the explosion-proof valve is provided with a thin rubber diaphragm which is broken by an excessive pressure. The operating pressure can be adjusted by controlling the thickness of the diaphragm. However, such operating pressure control is very difficult since a rubber diaphragm having a uniform thickness is not always easily available and the strength of the diaphragm varies with the aging of the rubber, and, in an extreme case, the diaphragm may crack and become unusable for an explosion-proof valve.

Therefore, an object of this invention is to provide an improved explosion structure for an electrolytic capacitor, which has none of the above-mentioned disadvantages.

According to this invention, the electrolytic capacitor comprises a cup-shaped metal casing and a terminal plate fitted in the opening of the casing. The terminal plate comprises a bottom plate made of thermoplastic resin and a sealing plate having a through hole. The bottom plate is provided with a cylindrical projection having a hollow passage which engages with the through hole of the sealing plate, and the projection has a thin diaphragm therein, which is molded integrally therewith and closes the hollow passage.

This invention will be described in more detail in comparison with the prior structures with reference to the accompanying drawings.

In the drawings.

Throughout the drawings, like reference numerals are used to denote corresponding structural components.

Figure 1:
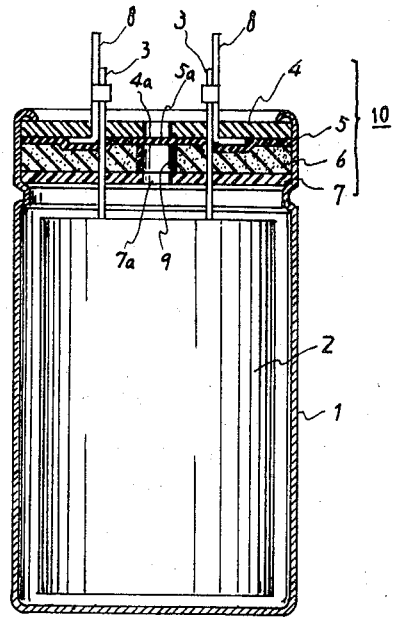
FIG. 1 is a cross sectional view of an electrolytic capacitor representing an example of the prior explosion-proof structure.

Referring to FIG. 1 representing an example of the prior art, the electrolytic capacitor comprises an aluminum casing 1, a capacitor element 2 having lead conductors 3 and a terminal plate 10 having a pair of terminals 8 coupled to the lead conductors 3. The terminal plate 10 consists of a sealing plate 4 having a central hole 4a, a thin rubber diaphragm 5, a soft rubber layer 6 having a central hole reinforced with a hard cylinder 9 and a bottom plate 7 having a central hole 7a. The terminal plate 10 is fixed to the opening of the casing 1 by swaging the edge of the casing. It is apparent that the portion of the thin rubber diaphragm 5, which is exposed within the central hole of the terminal plate 10 constitutes an explosion-proof valve.

Figure 2:
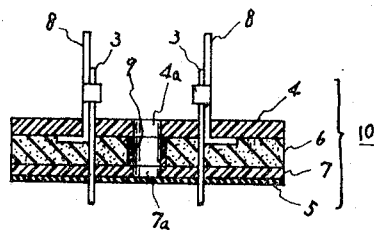
FIG. 2 and 3 are cross sectional views representing two other examples of prior explosion-proof structures.

The second example of the terminal plate 10 shown in FIG. 2 is similar to that of FIG. 1, except that the thin rubber diaphragm 5 is located below the bottom plate 7.

Figure 3:
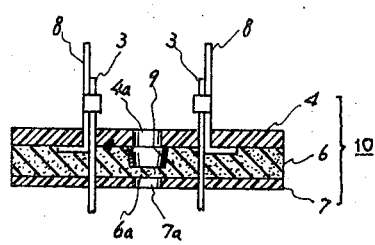

The prior terminal plate 10 shown in FIG. 3 has no rubber diaphragm but a part of the thickness of the soft rubber layer 6 closes the central hole to constitute an explosion-proof valve.

Although each of the above three examples differ, they are same in that they have a rubber explosion-proof valve which presents numerous difficulties in the control of the operation pressure as described in the preface.

Figure 4:
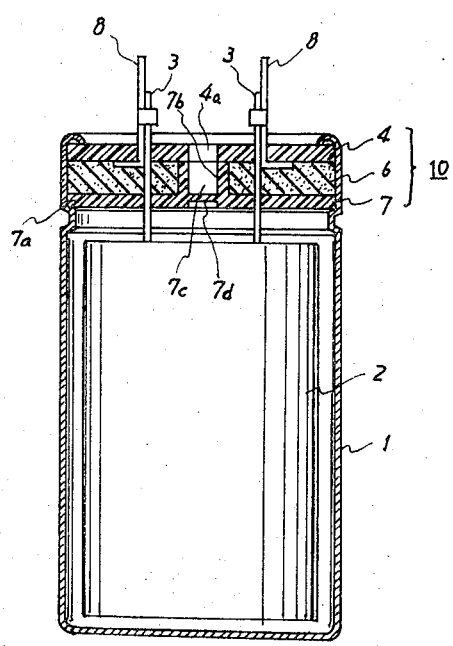
FIG. 4 is a cross sectional view of an electrolytic capacitor representing an embodiment of an explosion-proof structure according to this invention.

Referring now to FIG. 4 representing an embodiment of this invention, the terminal plate 10 of this electrolytic capacitor consists of a sealing plate 4 having a central hole 4a, a soft layer 6 and a bottom plate 7. The bottom plate 7 is composed of a circular disc portion 7a and a cylindrical projection 7b having a hollow passage 7c and a thin diaphragm 7d is provided in the passage 7c to close it. These parts 7a, 7b and 7d of the bottom plate 7 are molded integrally with thermoplastic resin such as polyethylene or polypropylene. Such synthetic resin materials can be selected rather critically in their softening temperatures and exhibit less aging effect than rubber material. Moreover, the thickness of the diaphragm 7d can be precisely selected since it can be formed by molding. Further, the bottom plate structure of this invention can be easily manufactured in mass at low cost and can reduce the number of components of the terminal plate to facilitate its assembling process.

The location of the diaphragm 7d should be taken into consideration. It may be damaged by careless handling if it is too close to the bottom face, but it may affect the explosion-proof function due to delayed softening if it is located too high. According to the results of experiments, the height of the diaphragm 7c may be preferably selected within one-half of the total height of the hollow passage 7c.

What is claimed is:

1. An electrolytic capacitor, comprising a metal casing, a capacitor element and a terminal plate fitted in the opening of said casing, said terminal plate including a bottom plate made of thermoplastic resin and an overlying layer of relatively soft material for sealing the casing, said bottom plate being provided with a cylindrical projection having a hollow passage therein and a thin diaphragm within and closing said passage, said diaphragm and said projection being formed integrally with said bottom plate and spaced inwardly from the bottom surface of the bottom plate a distance not greater than one-half the length of said passage.

2. An electrolytic capacitor according to claim 1 wherein said thermoplastic resin is selected from the group consisting of polyethylene and polypropylene.

* * * * *